US009398210B2

(12) United States Patent
Stach et al.

(10) Patent No.: US 9,398,210 B2
(45) Date of Patent: Jul. 19, 2016

(54) METHODS AND SYSTEMS FOR DEALING WITH PERSPECTIVE DISTORTION IN CONNECTION WITH SMARTPHONE CAMERAS

(75) Inventors: John Stach, Tualatin, OR (US); Ravi K. Sharma, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 1083 days.

(21) Appl. No.: 13/088,259

(22) Filed: Apr. 15, 2011

(65) Prior Publication Data
US 2012/0218444 A1    Aug. 30, 2012

Related U.S. Application Data

(60) Provisional application No. 61/446,464, filed on Feb. 24, 2011.

(51) Int. Cl.
*H04N 5/232* (2006.01)
*G06T 1/00* (2006.01)

(52) U.S. Cl.
CPC .......... *H04N 5/23222* (2013.01); *G06T 1/0021* (2013.01); *H04N 5/23258* (2013.01); *H04N 5/23293* (2013.01)

(58) Field of Classification Search
CPC ..... H04N 5/361; H04N 5/3575; H04N 5/378; H04N 9/045; G06T 5/001
USPC ........................................................ 348/241
See application file for complete search history.

(56) References Cited

U.S. PATENT DOCUMENTS

| | | | |
|---|---|---|---|
| 7,711,564 B2 | 5/2010 | Levy et al. | |
| 7,946,921 B2 | 5/2011 | Ofek et al. | |
| 2003/0219145 A1 | 11/2003 | Smith | |
| 2008/0112596 A1 | 5/2008 | Rhoads et al. | |
| 2009/0116683 A1 | 5/2009 | Rhoads | |
| 2010/0045816 A1 | 2/2010 | Rhoads | |
| 2010/0046766 A1 | 2/2010 | Gregg et al. | |
| 2010/0208057 A1 | 8/2010 | Meier et al. | |
| 2011/0025829 A1 | 2/2011 | McNamer et al. | |
| 2011/0034176 A1* | 2/2011 | Lord et al. ................ 455/450 |
| 2011/0090253 A1 | 4/2011 | Good | |
| 2011/0249095 A1* | 10/2011 | Kim et al. ...................... 348/46 |
| 2011/0292078 A1 | 12/2011 | Lapstun et al. | |
| 2011/0313653 A1* | 12/2011 | Lindner ..................... 701/201 |

FOREIGN PATENT DOCUMENTS

WO    WO2012116262    8/2012

OTHER PUBLICATIONS

PCT Written Opinion and Search Report of the Int'l Searching Authority, PCT/US12/26464, May 29, 2012.
(Continued)

*Primary Examiner* — Twyler Haskins
*Assistant Examiner* — Fayez Bhuiyan
(74) *Attorney, Agent, or Firm* — Digimarc Corporation

(57) ABSTRACT

Arrangements are detailed to aid a user in positioning a camera-equipped device (e.g., a smartphone) at a particular viewing position relative to an object being imaged. Other embodiments discern the device's viewing position, and then undertake image or other processing that is dependent on such viewpoint. A great number of other features and arrangements are also detailed.

32 Claims, 7 Drawing Sheets

(56) References Cited

OTHER PUBLICATIONS

Bimber, et al, The Virtual Showcase, IEEE Computer Graphics and Applications, Nov.-Dec. 2001, pp. 48-55.
Bleser, Online Camera Pose Estimation in Partially Known and Dynamic Scenes, IEEE Int'l Symp. on Mixed and Augmented Reality, 2006, pp. 56-65.
Heikkila, et al, A Four-Step Camera Calibration Procedure with Implicit Image Correction, Proc IEEE Conf. on Computer Vision and Pattern Recognition, 1997, pp. 1106-1112.
Herling et al, An Adaptive Training-Free Feature Tracker for Mobile Phones, Proc. 17th ACM Symp. on Virtual Reality Software and Technology, 2010, pp. 35-42.
Jung et al, AC-Sense—Mobile Phone Localization System via Cooperative Sensing with Accelerometers and Cameras, Technical Report, 2009.
Nasiri et al, Motion Processing—The Next Breakthrough Function in Handsets, InvenSense, Jul. 2009.
Olympus News Release, Olympus Tough TG-810, Mar. 20, 2011.
Paucher, et al, Location-Based Augmented Reality on Mobile Phones, IEEE Conf. on Computer Vision and Pattern Recognition, Jun. 13, 2010, pp. 9-16.
Randeniya, et al, Calibration of Intertial and Vision Systems as a Prelude to Multi-Sensor Fusion, Transportation Research Part C 16, 2008, pp. 255-274.
Rohs, A Conceptual Framework for Camera Phone-based Interaction Techniques, Proc. of PERVASIVE 2005, Munich, Germany, May 2005, 19pp.
Rohs, Real-World Interaction with Camera Phones, Ubiquitous Computing Systems, 2005.
Rohs, Using Camera-Equipped Mobile Phones for Interacting with Real-World Objects, Advances in Pervasive Computing, 2004.
RulerPhone, WebArchive of benkamens.com web page, 2009.
Simon, Immersive Image-Based Modeling of Polyhedral Scenes, IEEE Int'l Symp on Mixed and Augmented Reality, 2009, pp. 215-216.
Tsai, A Versatile Camera Calibration Technique for High-Accuracy 3D machine Vision Metrology Using Off-the-Shelf TV Cameras and Lenses, IEEE J. of Robotics and Automation, Aug. 1987, pp. 323-344.
Elmenreich, An Introduction to Sensor Fusion, Research Report 47/2001, Vienna University of Technology, 2001, 28pp.
PCT International Preliminary Report on Patentability, PCT/US12/26464 (published as WO2012116262), mailed Sep. 6, 2013.

\* cited by examiner

METHODS AND SYSTEMS FOR DEALING WITH PERSPECTIVE DISTORTION IN CONNECTION WITH SMARTPHONE CAMERAS

RELATED APPLICATION DATA

This application claims priority benefit to provisional application 61/446,464, filed Feb. 24, 2011, the disclosure of which is incorporated by reference herein, in its entirety.

BACKGROUND AND SUMMARY

Smartphones are increasingly being used with "visual search" applications. One visual search application decodes digital watermark data steganographically encoded (i.e., hidden) in printed imagery (such as in a magazine or on product packaging) and enables the phone to link to associated information and services. Examples of digital watermark technology, and visual search applications, are detailed in Digimarc's patents U.S. Pat. Nos. 6,483,927, 6,590,996 and 6,947,571, and in application Ser. No. 12/774,512 (filed May 5, 2010), Ser. No. 12/797,503 (filed Jun. 9, 2010), and Ser. No. 13/011,618 (filed Jan. 21, 2011).

Perspective distortion can sometimes interfere with proper decoding of digital watermark data. That is, if a watermarked object is imaged by a smartphone at a relatively large off-axis angle (e.g., greater than 15 or 30 degrees), the hidden watermark data may be sufficiently distorted by the perspective viewing angle that the decoding algorithm does not recognize it.

Relatedly, if a watermarked object is imaged from too-great or too-close a distance, the scale of the embedded watermark in the captured imagery may be so different than what is expected that the decoding algorithm again cannot recognize it. (This may be regarded as another type of perspective distortion.)

A related concern is consumer confusion. If a consumer uses a smartphone to image a magazine page, and no watermark is promptly detected, is it because the page does not include a watermark to which the smartphone should respond? Or is it because the magazine page is presented with an unsuitable perspective?

Accordingly, it is desirable to assist the consumer in capturing imagery that has relatively small perspective distortion (e.g., less than 15 or 30 degrees) or, alternatively, to warp captured imagery so as to un-do most of its original perspective distortion. Relatedly, it is desirable to guide the consumer in capturing imagery of a suitable scale state for the detector (or, alternatively, to re-size captured imagery so as to change its scale state to a suitable value).

In accordance with one aspect of the present technology, the perspective of an object relative to a smartphone is determined from a quick wave of the smartphone over the object. Data captured in such action is used to discern, at least partially, a geometrical relationship between the smartphone and the object. This geometrical information can include data about the off-axis viewing angles, and/or the distance to the object. Such information can then be used to help guide the user in acquiring imagery with reduced perspective distortion, or to process captured imagery to mitigate such distortion.

Furthermore, the determined geometrical information can include data about the size and shape of the object. For example, the object may be a curled or rolled newspaper. Its geometry can be discerned, and such deformation can be reversed from captured imagery in the same way that perspective distortion can be reversed.

Once the smartphone is in a suitable geometric pose relative to the object (or once the perspective geometry is characterized so that suitable corrective image processing can be applied), the smartphone will promptly detect the watermark (e.g., in less than 0.5, 1, or 2 seconds)—if one is present. If no watermark is detected within such period, the phone may signal to the user—confidently—that there is no watermark in the captured imagery. Such arrangement provides an enhanced experience to the consumer—redressing the perspective difficulty, and eliminating the uncertainty of the prior art.

The foregoing and other features and advantages of the present technology will be more readily apparent from the following detailed description, which proceeds by reference to the accompanying drawings.

DETAILED DESCRIPTION

Figure 1:
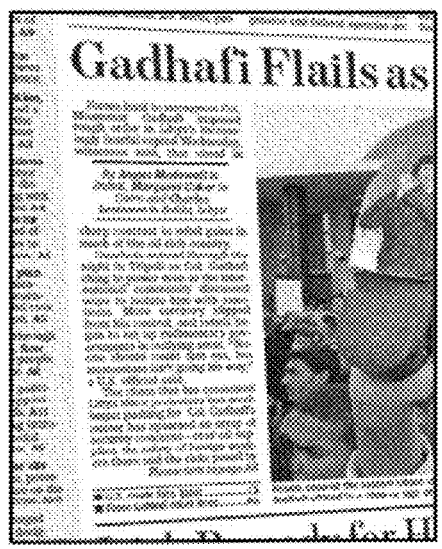
FIG. 1 shows a frame of imagery captured by a smartphone from a newspaper, including angular perspective distortion.

As will become apparent, the present disclosure encompasses a variety of different technologies, which can be employed in numerous contexts. However, for expository convenience, it may be helpful to start with two illustrative implementations—both involving a user who wishes to use a smartphone to access the latest video clips of democratic uprisings in Libya, through use of a related article she sees in a local print newspaper.

In the first implementation, the user places her smartphone at an arbitrary first position relative to the printed newspaper article, and then moves the phone a short distance to an arbitrary second position—in both positions capturing imagery from the newspaper. A moment later the smartphone decodes digital watermark data hidden in the newspaper printing, and chimes softly. A second or two later a menu including the latest video clips from Libya appears on the smartphone screen. The user taps one of the menu options, and the selected video starts to play.

What happens, behind the scenes, is that the smartphone captures imagery as the user holds and moves the phone over the newspaper, including a frame of pixels at the first position and a frame of pixels at the second position. The two frames include at least some image features in common, e.g., a block of newspaper text. This block of text appears slightly different in the two frames, because of the two different positions from which it was viewed. By analyzing the appearance of the text block in the two frames, the phone determines the geometrical pose of the newspaper relative to the phone—both when the first frame of imagery was captured, and also when the second frame of imagery was captured. The phone selects one of the two images (e.g., whichever is in sharper focus, or best-exposed), and then applies a geometrical correction factor—stretching or warping the image so as to remove perspective viewing effects, and yielding a straight-down, "plan view" of the newspaper page. This geometrically-corrected image data is then provided to a watermark detector, which quickly finds the hidden watermark information encoded in the newspaper print. This watermark information, in turn, triggers the phone to present the menu listing the latest video clips.

The second implementation is similar, and again involves the user placing the phone at an arbitrary first position over the printed newspaper article, and then moving the phone a short distance to an arbitrary second position. In this implementation, however, the phone then presents a graphical display that guides the user in moving the phone to a further, third, position. The user moves the phone towards the indicated third position (a position at which watermark reading is enhanced). An instant later the phone again decodes digital watermark data hidden in the newspaper printing, and the menu appears as before. The user then taps one of the menu options, and the selected video starts to play.

What happens, behind the scenes, in this second implementation is initially similar to what happened in the first implementation. Imagery is captured both at the first and second positions, and from this information the phone discerns the viewpoint perspective geometry from the two positions. Rather than using this viewpoint geometry information to correct captured imagery, however, the phone uses its knowledge of the phone-newspaper geometry to identify a favored viewing position from which a third frame of image data may be captured. The phone then presents one or more graphical features on the screen that serve to guide the user in moving the phone towards the favored position.

A simple such embodiment identifies the overlap portion of depicted newspaper imagery that the two frames have in common, and then virtually augments the camera view with a graphical indicia (e.g., a colored block or a virtual logo—which may be 3D or animated) that is anchored to the center point of this common imagery. As the phone is moved, and as different imagery enters or leaves the frame, this indicia moves with the earlier-determined center point. If the user moves the phone towards the newspaper, the indicia grows in apparent size—in tandem with the scale of the newspaper text over which it is overlaid, and vice versa. The smartphone display also presents a pair of bracket frames at the center of the screen. Referring to these guides, the user moves the phone until the indicia is centered on the screen and—optionally—until its size fills the bracketed space.

(The favored position is where the phone is directly over, and parallel to the newspaper article of interest, i.e., with the surface normal from the newspaper page passing through the phone lens, and vice versa. The favored position may also, or alternatively, be with the phone at a desired viewing distance from the page, so as to provide imagery to the watermark detector at a preferred pixels-per-inch resolution—dependent on the scale with which the watermark information was encoded on the printed page.) The phone, meanwhile, doesn't wait until the user has finished moving the phone to the third, favored, position; the phone acquires frames of imagery throughout the repositioning exercise. Before the phone reaches the favored reading point, imagery has usually been captured that is within the perspective reading tolerance of the watermark detector (e.g., +/−15 or 30 degrees, and within a generous distance/scale tolerance). The watermarked information is then read, and the responsive action (e.g., presentation of the menu) is then executed.

Figure 2:
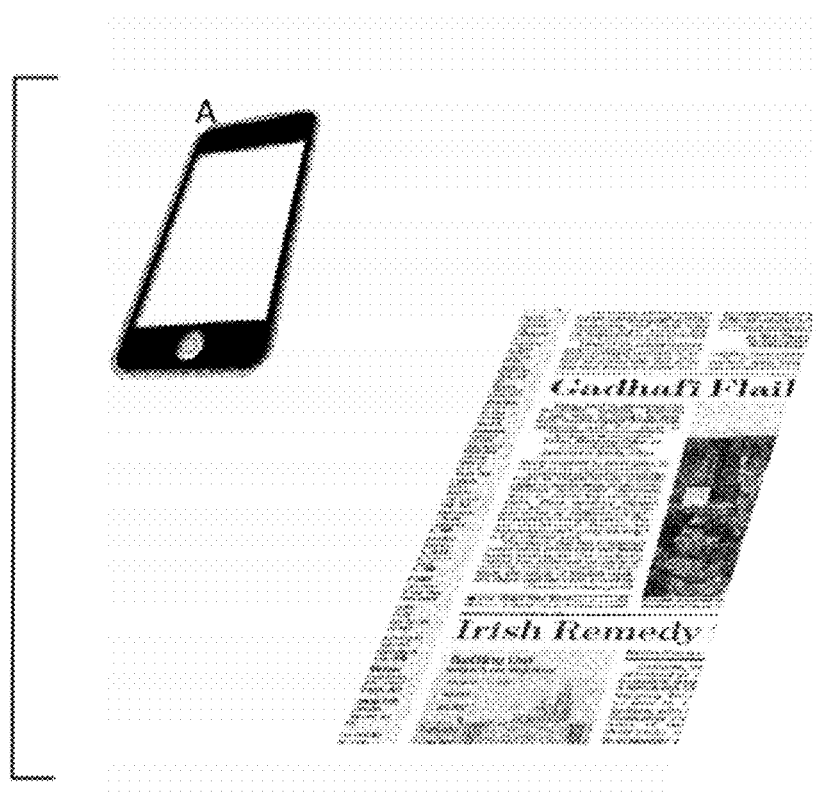
FIG. 2 shows a geometrical arrangement in which the imagery of FIG. 1 was captured by the smartphone.

The foregoing is made clearer by the Figures. FIG. 1 shows an image frame captured by a smartphone from a newspaper. The frame is rectangular (i.e., 960 by 640 pixels). However, as is apparent from the non-parallel lines in the newspaper layout, the captured imagery suffers from perspective distortion. That is, the region of the newspaper captured in the rectangular frame is not itself rectangular. Such distortion arises, e.g., when the camera is not squarely centered over the newspaper portion of interest, and parallel to it. The particular distortion of FIG. 1 arose because the camera was at a viewpoint where it was looking towards the right a bit, and up slightly. FIG. 2 attempts to show such a geometrical relationship.

Figure 3:
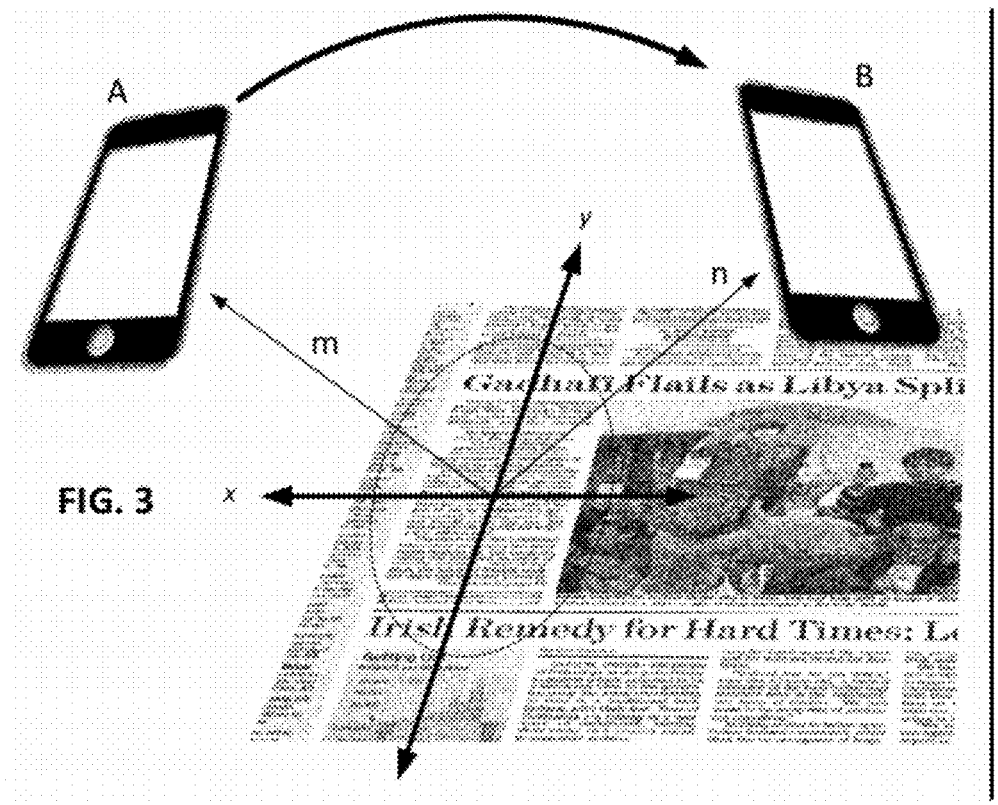
FIG. 3 illustrates a sweep motion, and an associated geometrical framework, used in an exemplary implementation of the present technology.

In accordance with one particular implementation of the present technology, this perspective distortion is mitigated by the user sweeping the phone from the initial position ("A") to a second position ("B"), as shown in FIG. 3. In both positions A and B the phone captures a frame of imagery, and the two frames overlap to capture a common region of the newspaper. (A dashed common oval is shown, but in actual practice the area of overlap is typically an irregular polygon.)

Figure 4:
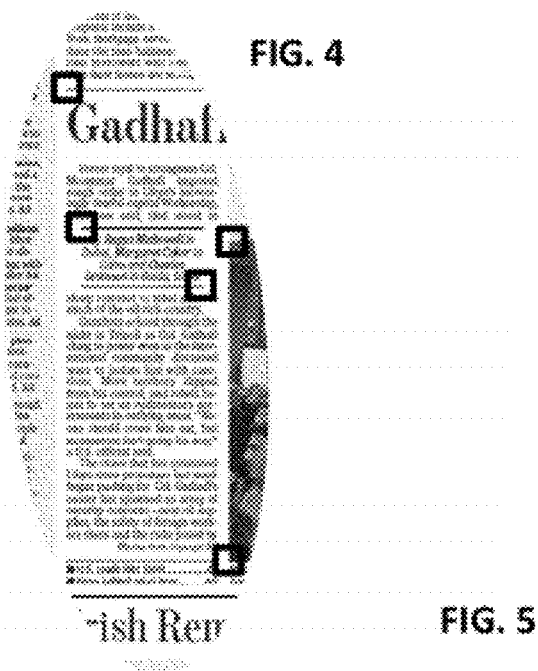
FIG. 4 shows image keypoints that can be used to determine the geometrical relationships between two frames of captured imagery.

Geometrical analysis techniques are then applied to the two frames of imagery to characterize the geometry involved. This operation typically involves identifying plural keypoints that are depicted in both of the image frames. Illustrative keypoints are shown by the bold boxes in FIG. 4, and are typically corner points and other salient image features that can be readily identified. (Many more points may be used; only a few are illustrated.) Based on such analysis, the smartphone determines the camera's pose relative to the newspaper both when the camera was at position A, and also when the camera was at position B.

In this particular implementation, the newspaper is assumed to lie in the X-, Y-plane of a Cartesian coordinate system (shown by bold axes in FIG. 3), with the origin centered at the center of the region of frame overlap. The camera position A, from which the first frame was captured, is then expressed in terms of two angles that characterize vector "m," which extends from the origin to the lens of the camera at position A. The first of these angles is the angle between the positive X-axis, and the projection of vector m into the X-, Y-plane (e.g., the compass direction to the camera). The second angle is the elevation angle of vector m above the X-, Y-plane.

The geometrical analysis also yields the three angles that define the phone's inclination in space, at position A. (These three angles are sometimes referenced by their aeronautical terms: pitch, roll and yaw.)

A similar procedure is applied to find the pose of the camera at location B relative to the newspaper.

Figure 5:
FIG. 5 shows the FIG. 1 frame of imagery after processing to counteract the angular perspective distortion.

Once the pose of the camera relative to the newspaper is understood, the perspective distortion introduced in imagery captured from that pose can be determined, and corrected-for. This is shown in FIG. 5. The rectangular frame of FIG. 1, captured from position A, has been distorted so that it is given a "plan" aspect—as if captured from directly overhead. The newspaper layout lines at the top and bottom of the article are now parallel. A dashed rectangle is presented around the figure to give the reader some visual reference. (A consequence of such stretching is that the rectangular frame of imagery has now been warped into an irregular quadrilateral—corresponding to the region of the newspaper depicted in the originally-captured FIG. 1 frame.)

The information thus-determined characterizes the angular geometry, but leaves scale ambiguous. (From the camera's standpoint, a one inch object, viewed 30 degrees off-axis from a distance of a foot, is indistinguishable from a two inch object, viewed 30 degrees off-axis from a distance of two feet, etc.) In some applications, this ambiguity is irrelevant. But in others—such as in decoding steganographic digital watermarks—scale can be important.

Various techniques can be used to introduce scale information into the geometrical model. One is to sample sensor data at first- and second-ends of the phone's sweep movement (i.e., A and B in FIG. 6), and estimate the linear distance "d" (i.e., positional translation) from this data.

3D accelerometer data can be used for this purpose. By integrating acceleration (in each of three dimensions), velocity (in each of three dimensions) can be determined. By integrating velocity (in each of three dimensions), positional translation (in each of three dimensions) can be determined.

(A MEMs accelerometer found in certain smartphones, which is suitable for use with such arrangements, is the LIS302DL—a 3-axis device manufactured by STMicroelectronics. A suitable 3-axis gyroscope is the STMicroelectronics L3G4200D. A suitable 3-axis magnetometer is the Asahi Kasei Microsystems AK8973.)

Accelerometers respond to gravity, which may be manifested in several of the X-, Y- and Z-dimensions—depending on device orientation. The distance computation is simplified by assuming that the initial velocity is zero—usually a correct assumption, provided the device is held steady when the initial sensor data is captured (and provided the user is not in a moving train, or the like). In this case, the baseline accelerometer data in X-, Y-, and Z- is simply the gravitational effect, which can be subtracted-out. (The frame of imagery used as the first image data can be selected from a stream of imagery based on detection of a minima in change the accelerometer data—indicating an instant of minimum device movement.) With the baseline gravitational value removed from each accelerometer reading, integration at uniformly-spaced sampling instants can be effected by simply summing successive accelerometer readings, and multiplying by an empirically determined scale factor.

Figure 7:
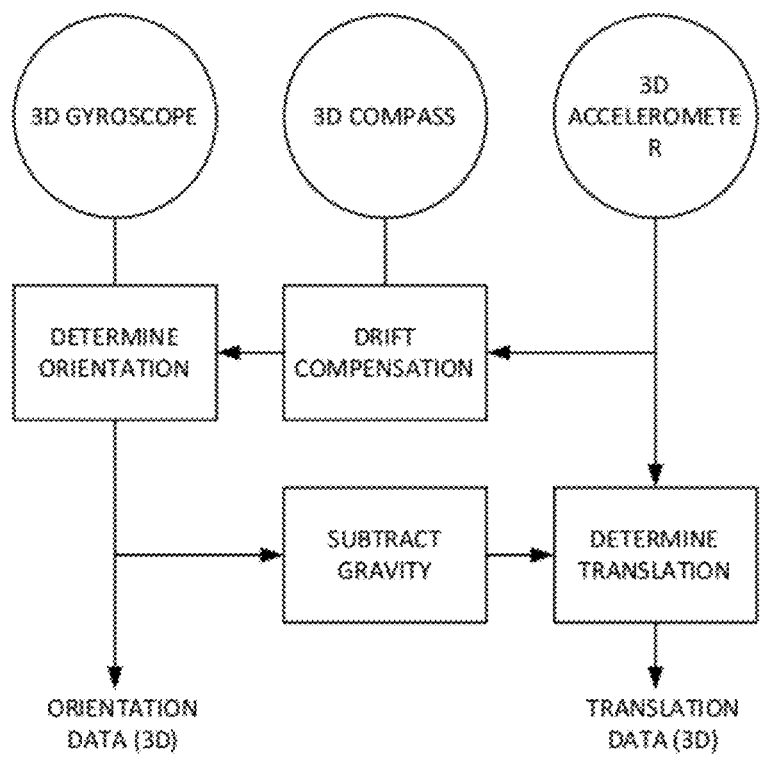
FIG. 7 shows a sensor fusion approach for discerning phone position.

More accurate distance measurements can be obtained by using other, or additional, sensors. One such arrangement, represented by FIG. 7, uses an over-determined sensor-fusion approach, producing six output parameters (3D orientation and 3D translation) based on nine input parameters (3D gyroscope, 3D compass, and 3D accelerometer). FIG. 7 is based on Nasiri et al, Motion Processing: The Next Breakthrough Function in Handsets, InvenSense, 2010.

Figure 6:
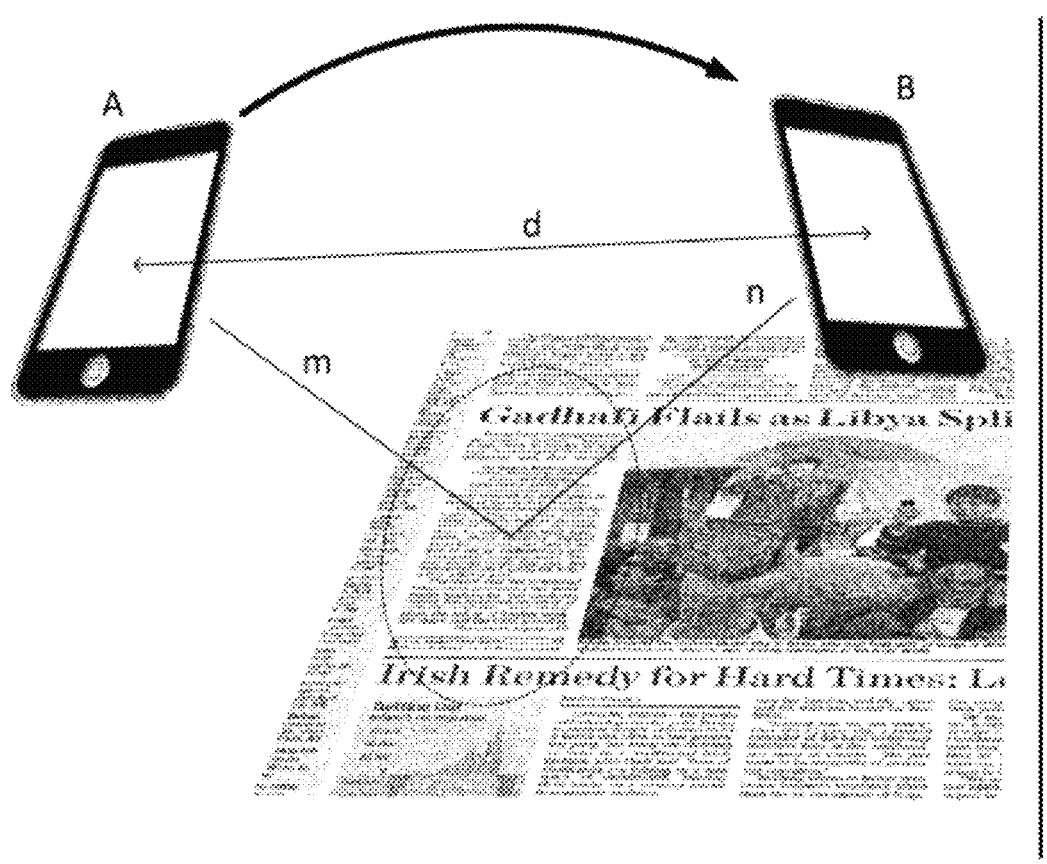
FIG. 6 is like FIG. 3, but also shows a distance "d" that can be used to resolve the distance parameters in the image capture environment.

Distance "d" between the start and end points of the FIG. 6 sweep can also be determined by reference to radio signals sampled at those locations. Examples include traditional GPS, differential GPS, assisted GPS, etc. More accurate radio-based location services are also possible, as taught by U.S. Pat. No. 7,876,266, and patent publications 2010202300, 2009313370, 2009233621, and 2009213828.

(Other distance information can alternatively be determined and used. For example, the smartphone's auto-focus system may output data indicating the distance between the lens and the subject. Or a sonar-like approach can be used—emitting ultrasonic clicks from the smartphone, and measuring the round-trip travel time for the echoes off the object being imaged.)

Once any distance measure within the relevant geometry becomes known (e.g., the distance "d" in FIG. 6), this reveals the scale of the model—including the lengths of vectors m and n, and the scale of the imaged newspaper text. Once the newspaper text scale is quantified, the image can be re-scaled, if necessary, so that the imagery has a resolution suitable for the watermark detector being used.

For watermark reading, it is not necessary to discern the distance "d," nor the angular geometry, with high precision. The noted watermark technology allows reliable detection over scales ranging from 0.5 to 2.0 of nominal, and at off-axis poses of up to 15 or 30 degrees. So if a 12" sweep is roughly measured to be 20", or if a 25 degree angle is roughly measured to be 35 degrees, an encoded watermark will still be read correctly. (In the former case, the image data presented to the detector may be gauged to be 60% of its actual dimension—within the range of correct watermark detection. Similarly, in the latter case, applying a 35 degree correction factor to the angular distortion restores the image to a view with a residual perspective error of only 10 degrees—again within the range of correct watermark detection.)

Since high precision is not required, the geometrical analysis can be performed using down-sampled image data—speeding the calculations. Once the geometry is understood, full resolution imagery can be applied to the watermark detector.

Instead of determining the scale of the object by geometrical analysis (e.g., by discerning the angular span of the sweep from object, together with the length of the sweep), object scale can be estimated by inserting a reference item of roughly known dimension within the camera field of view, in or near the plane of the object. For example, the user's thumb or finger can be placed on the object. Or a coin, key, banknote, or item from the user's wallet (e.g., a driver's license, credit card, business card, etc.) can be used. Known object recognition techniques can be applied to identify such item. The scale of the item can then be retrieved from a data store (e.g., the diameter of a nickel is 0.835 inches), and this information then can be used to discern the scale of the imaged object.

To illustrate, if a captured portion of a magazine page is 750 pixels in width, and a nickel placed on the page spans 200 pixels, then the imaged part of the magazine page is 3.13 inches in width. The sampled magazine resolution is thus 240 pixels/inch. If the watermark detector works best with imagery sampled at 100 pixels per inch (and the detector has a detection range of 50-200 pixels/inch), the user can be directed to move the camera away from the object. Once the user moves the camera a short distance, the watermark detector should succeed in decoding any embedded watermark data. (Alternatively, the smartphone can down-sample the captured imagery by a factor of 2, or 2.4—allowing detection without any movement of the phone.)

Figure 8:
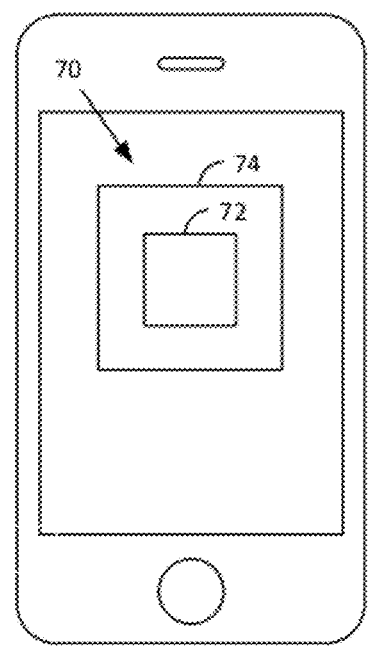
FIG. 8 shows an exemplary smartphone user interface.

The re-positioning guidance provided to the user can be via software that presents a graphical UI, or audible instructions, etc. A suitable graphical UI 70 is shown in FIG. 8 and includes two indicia 72, 74 that are overlaid on the imagery (not shown)—one (72) fixed in size, and one (74) that increases in size as the phone is moved towards the page being imaged. (The illustrated indicia are boxes, but any figures could be used.) The user is instructed to move the phone so the two indicia have the same scale. In the FIG. 8 example, the user would move the phone away from the page so that the size of indicia 74 contracts to match the size of indicia 72.

In an alternative arrangement, the scale information determined through use of the reference object is not used to guide the user in re-positioning the phone. Rather, imagery captured from a too-close, or too-distant perspective, is virtually rescaled (e.g., by a factor of 2 or 2.4, in the above example), and the rescaled imagery is then provided to the watermark detector. In still a further variant, the imagery is not rescaled, but instead the watermark detector is informed about the scale of the imagery, and adapts its operation to expect imagery of the captured scale.

A further variant is to not place the physical reference item in front of the camera—in the same field of view as the intended subject. Instead, the reference item is placed on the display screen. The user then moves the camera until the physical reference item has a particular spatial relationship with imagery presented on the screen.

Figure 14:
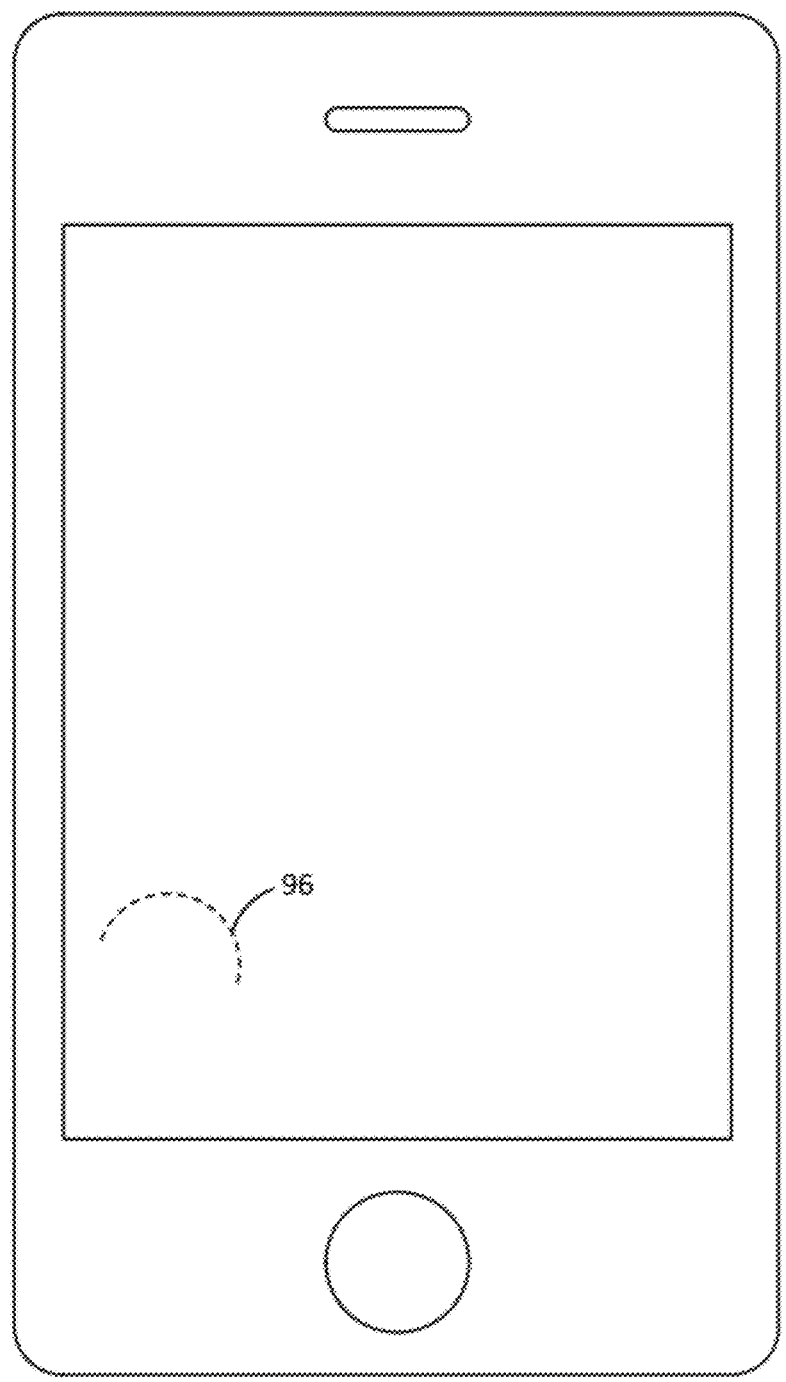
FIG. 14 shows a feature of yet another user interface.

Consider FIG. 14. Here the software has determined the current scale of the captured imagery (not shown), and has overlaid a thumb outline 96 in a corner of the display. The software scales the thumb outline in correspondence with the determined scale of the imagery. The user positions his or her thumb on the indicated output, and then moves the phone towards—or away from—the object being imaged. As the scale of the captured imagery changes with camera position, the software likewise changes the size of outline 92. The user positions the phone to a distance from the object at which the outline 92 is just visible around the user's thumb. At this position, the scale of the captured imagery is optimized for watermark detection. (The scaling of the outline size can be driven by detected scale of the captured imagery. Or, after the initial scale of the imagery has been determined, and the outline has been initially sized, further scaling can be driven based on data from the phone's motion/position sensor data.)

In a particular example, if the initial imagery is determined to be half its optimum scale, the software presents outline 92 at half-size (compared to a normal thumb). Then, as the user moves the phone towards the object, to double its apparent scale, the software scales the size of the overlaid outline 92 to likewise double—until it just circumscribes the tip of the user's thumb.

Of course coins or other reference objects can be used instead of a thumb.

Still another way of sensing perspective distortion is to include a reference marker on the object being imaged. The marker can be overt, or can be encoded in a manner that escapes human attention—but can be discerned by a camera phone. Exemplary markers are noted in earlier-cited application Ser. No. 12/797,503 and in published application 20100092079; methods of their concealment are noted in the former document.

Yet another approach to determining perspective distortion is to start by simply laying the phone, camera-down, on the object (e.g., a newspaper page), and then lifting it up to a viewing position. If the newspaper stays stationary, the motion/position sensors in the phone (e.g., magnetometers, accelerometers, and/or gyroscopes) can track the phone's movement from its rest position on the newspaper to its end position. This information provides 6DOF data about the phone's end position relative to the newspaper (e.g., offset in X-, Y-, and Z-, and pitch, yaw and roll).

Figure 9:
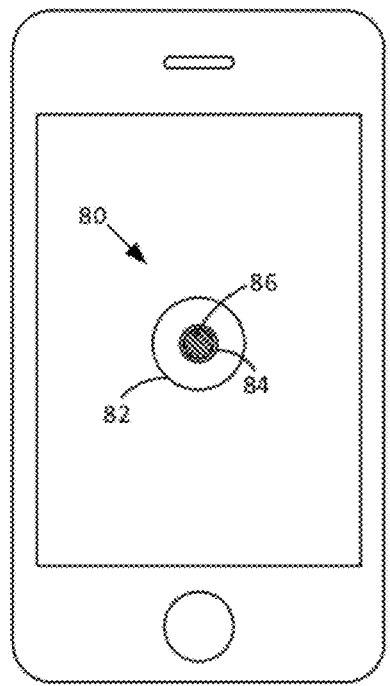
FIGS. 9-11 show aspects of another exemplary user interface.
Figure 10:
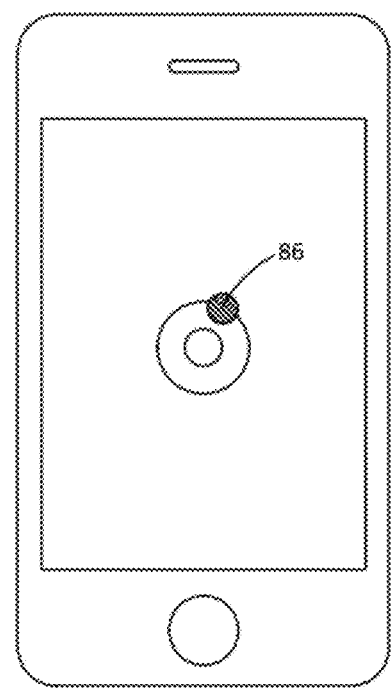
Figure 11:
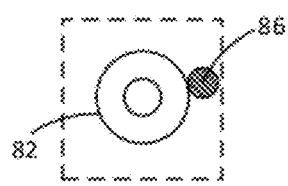

One possible user interface (UI) 80 for such an arrangement is shown in FIGS. 9-11. This UI comprises a graphic that is overlaid atop imagery from the camera (not shown for clarity of illustration), and includes two fixed circles 82 and 84, and a movable ball 86. (A cross-hair arrangement can additionally, or alternatively, be presented.)

The user positions the phone up flat against the object to be imaged. This initial resting position can be determined in a variety of ways. One is for the motion/position sensors in the phone to settle (e.g., with on-going variations below a small threshold value for an interval of time). Another is for the camera on the back of the phone to go dark (because its aperture is blocked by the object). (This technique relies on a good light-seal between the back of the camera and the object, so is not well-suited for non-planar or non-rigid objects.) Still another is for the user to instruct the phone that it is at a resting position, e.g., by a tap on the screen, or by a spoken instruction. Other arrangements are naturally possible.

Once it has been determined that the phone is in its initial resting position, the software polls the 3D outputs from the magnetometer. In an illustrative embodiment, the magnetometer senses a vector towards north on a local horizontal plane, and outputs three data comprising components of this vector projected onto (1) the phone's X axis (e.g., across the face of the display); (2) the phone's Y axis (e.g., along the length of the phone); and (3) the phone's Z axis (e.g., along the thickness of the phone). These three parameters are stored to characterize the orientation of the phone in its initial resting position.

When in the initial resting position, the software also re-positions the ball 86 to the center of circles 82 and 84.

The user thereafter withdraws the phone from the object. As long as the plane of the phone (e.g., its X-Y plane) remains parallel to its initial resting position, the software continues to present ball 86 as centered in the circles 82, 84. If the user tilts the phone from this initial orientation, the software moves the ball in a corresponding direction (e.g., towards or away from the direction of tilt)—as shown in FIG. 10. (The software can also cause the color of the ball to change when it leaves its centered position, e.g., from green to red.)

The user continues to withdraw the phone from the object—using the UI indication to maintain the phone in an orientation parallel to the initial resting position (i.e., parallel to the object's surface). As the phone is moved, its camera continues to capture frames. At some point, the phone's distance from the object will enter the reading distance zone within which the watermark decoder can decode a payload from any watermark on the object. The phone will then chime, or otherwise signal to the user, and begin a watermark-responsive action.

In a particular implementation, as the phone is being withdrawn from the object, the software does not move the ball 86 unless it senses (e.g., from the magnetometer data) that the plane of the phone has been tilted more than 10 or 15 degrees. (The watermark detector can quickly find and detect watermarks within this range of geometric perspective, so no corrective feedback to the user is needed.)

In the illustrative arrangement, the ball 86 is bounded in its movement—even with the most extreme tilts. For example, the ball's furthest movement may be to a position where it just touches the outer circle 82 (FIG. 11). Or the ball may be confined to within a square region centered on the outer circle (shown in dashed lines in FIG. 11). This "sticky-ball" feature limits the screen area that must be monitored by the user to find the ball. (E.g., the ball will never move to the edge of the screen, or off the screen.) In other implementations, however, this convention need not be followed.

One advantage to the foregoing arrangement is that, by initially placing the phone on the object and then withdrawing it, parallelism to the object is easier to maintain—since it starts out properly parallel.

Another advantage is that the procedure is distance-agnostic. It does not matter at what scale the watermark was encoded, or whether the optimal reading distance is five inches or 12 inches, etc. At some point, as the phone is being withdrawn, it will enter the correct reading distance zone for the watermark.

The speed at which the phone can be withdrawn from the object depends on the particular implementation. If the phone's autofocus is slow, a lower withdrawal speed should be used. If the camera captures frames at a relatively high rate (e.g., 16 or 30 frames per second, as opposed to 6 or 10 frames per second), a faster withdrawal speed can be used (because motion blur won't be such an issue). Similarly, if the phone is being used in bright illumination, a faster withdrawal speed can be used (again, because motion blur won't be such an issue). In typical arrangements, a withdrawal speed on the order of one foot per 1-5 seconds is used.

Unlike traditional circular spirit level arrangements (such as are found on some carpenters levels), the present arrangement does not rely on the plane of the phone being horizontal in order for the ball 86 to be centered in circle 84. Instead, any arbitrary non-horizontal phone orientation can serve as the initial rest orientation, and the software then centers the ball 86 in the middle of circle 84 at such orientation.

It should be understood that the ball-in-circle UI of FIGS. 9-11 for providing smartphone-orientation feedback to the user is merely exemplary; the principles of this arrangement can be employed with a great variety of different user feedback paradigms.

In certain implementations, the above-described arrangements are user-selectable, e.g., as training guide modes. In another mode the user can elect to operate the smartphone without such guidance and/or perspective correction.

As noted, sensors other than—or an addition to—the magnetometer can be used. For example, the software may poll a 3D accelerometer when the phone is at its initial rest orientation, to determine the 3D components of the constant gravity vector. As the phone is withdrawn, the software can analyze the constant gravity vector to discern any shift in its direction (among the three components), and can control the UI 80 accordingly.

The next discussion reviews certain aspects of the foregoing, and provides additional information, in a step-by-step fashion. The detailed procedure results in superposition of a properly scaled virtual object (e.g., a logo) on the imaged scene as viewed through the smartphone camera.

If the subject functionality is not already provided by an on-going process, the user activates a software app that controls the detailed functionality. This app initiates a streaming-frame capture mode, and invites the user to point the camera at a watermarked document. The app collects image frames and monitors accelerometers. After one or more suitable frames has been captured (e.g., suitable in terms of camera stability, focus and/or lighting), the app signals the user (e.g., by a buzz or chime) to move the camera to another position above the document, e.g., by a manual scan or sweep left-to-right, or down-to-up, etc. The app records accelerometer and/or other motion/position sensor data during the scan movement.

At the end of the scan movement, the user can check to confirm that the image still encompasses the watermarked material. The app again collects one or more suitable image frames at this second position. (It may also collect frames during the scan, but this is not essential.) The app then determines salient image features in the starting and ending images, and identifies feature-correspondence between the two images. (If no correspondence between features is found, an error message is presented to the user.) Using the recorded sensor data, the linear distance between the starting and ending viewpoints is determined. From this information, together with the corresponding image features in the starting and ending images, the app determines the distance from the camera to the document, the perspective transformation, and the size of the document features (i.e., the scale of the imaged document).

Figure 12:
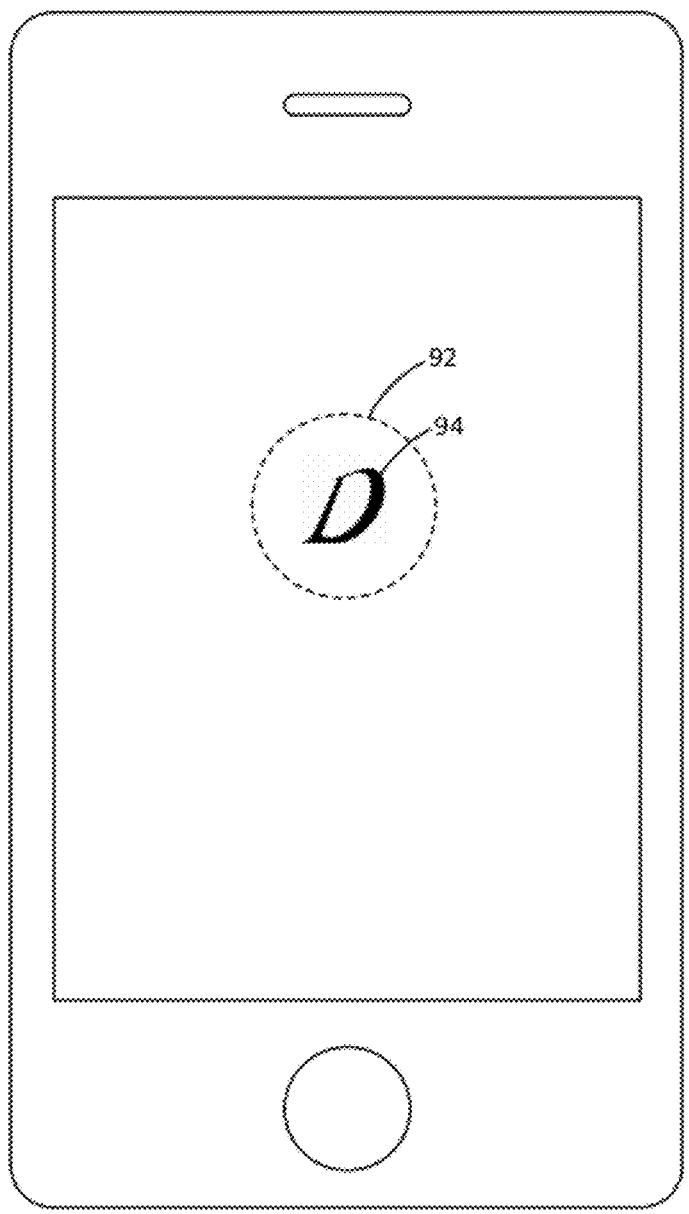
FIGS. 12-13 show aspects of still another user interface.

The app next overlays a dotted circle guide 92, brackets, or other such indicia, on the screen (FIG. 12). It also overlays a graphic—such as a logo "D" 94. This logo is virtually anchored to the center of the overlap region between the first and second image views, and is rendered so that it appears to lie in the same plane as the document being imaged. This results in an apparent perspective distortion of the logo that matches the perspective distortion of the document. The size of the logo is scaled to inversely correspond to the just-determined distance between the camera and the document.

Figure 13:
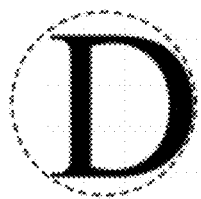

As can be seen, the logo "D" in FIG. 12 does not fill the circular guide area 92. To position the phone to an enhanced viewpoint, the user moves the phone so that the logo fills the guide area (e.g., as shown in the UI excerpt of FIG. 13). The color of the logo can switch (e.g., from red to green) to signal that the user should stop moving the phone, when the phone's position gives it a viewpoint at which the scale is satisfactory for watermark decoding.

(In the just-described arrangement, the user moves the phone to redress scale alone. Perspective was earlier-determined, and such perspective effect can be removed from the captured imagery by a suitable inverse-warp. Alternatively, the user can move the phone to dress both scale and perspective.)

Meanwhile, the camera continues to grab frames. It may apply some or all to a watermark detector (local, or remote), in case the detector can read the watermark despite a sub-optimal viewpoint. In any event, once a satisfactory viewpoint is reached, the app passes one or more frames of imagery to the watermark detector for decoding (perhaps after waiting for sensed motion to fall below a threshold value, to assure a sharp image).

Here, as elsewhere, multiple frames can be aligned and combined, e.g., to yield imagery with better resolution and/or lower noise.

The watermark detector processes the provided imagery, and initiates a responsive action based on the decoded watermark payload. (Alternatively, if no watermark is detected, the watermark detector can provide feedback to the user, such as that brighter illumination is required, or report that the object does not appear to be watermarked.)

In a variant of the just-described arrangement, instead of presenting a planar logo 94, an animated 3D model (e.g., a cube) is used, and rendered in accordance with the perspective viewpoint. When the phone is positioned at the optimum, plan, perspective, the screen no longer shows any visually-receding side of the 3D cube—but only shows the square front face of the cubes.

In another variant, the logo "D" is not warped to mirror the determined perspective distortion of the imaged object. Instead, only its scale is varied to track the distance to the object. (As before, the color may only change if both the viewpoint distance and perspective are satisfactory.)

It will be recognized that the arrangements detailed above can be used to capture imagery without consequential perspective distortion—by guiding the user in moving the phone (camera) to a favored viewpoint. Alternatively, these same arrangements can be used to sense a degree of perspective distortion from a particular viewpoint. Compensation can then be applied in processing of the captured imagery (or in decoding of the watermark payload) to redress the sensed perspective distortion.

While described primarily in the context of determining perspective to aid in reading steganographic digital watermark data, uses of the technologies detailed herein are not limited to that application.

One particular other use is to characterize a smartphone's view of an object in connection with deriving fingerprint data for identifying that object. Fingerprinting takes various forms, but basically distills imagery down to a smaller set of data by which the imagery (or an object depicted in the imagery) can be recognized. In typical use, a reference fingerprint is first generated from a known object, and added to a reference database. Thereafter, fingerprint data acquired from an unknown object is applied to the database, which searches for a close match—serving to identify the object.

One familiar example of image fingerprinting is the object recognition performed by the Google Goggles software app for iPhone and Android smartphones, detailed, e.g., in published patent application 20100260373.

Many fingerprint-based object recognition techniques are known, including robust hashing, SIFT and SURF.

One implementation of robust hashing is detailed in U.S. Pat. No. 6,671,407.

SIFT is an acronym for Scale-Invariant Feature Transform, a computer vision technology pioneered by David Lowe and described in various of his papers including "Distinctive Image Features from Scale-Invariant Keypoints," International Journal of Computer Vision, 60, 2 (2004), pp. 91-110; and "Object Recognition from Local Scale-Invariant Features," International Conference on Computer Vision, Corfu, Greece (September 1999), pp. 1150-1157, as well as in his patent U.S. Pat. No. 6,711,293.

SURF is another object recognition technology—somewhat related to SIFT, and described in Bay et al, "SURF: Speeded Up Robust Features," Eur. Conf. on Computer Vision (1), pp. 404-417, 2006.

Despite the robustness of many fingerprinting algorithms to different forms of content distortion, enhanced results can be achieved by providing image data that is as similar as possible to the original imagery on which reference fingerprint data was based. Typically, such original imagery is free of perspective distortion. Thus, techniques from the present disclosure can be applied to obtain imagery with reduced perspective distortion, prior to computing associated fingerprint data.

Yet another application that benefits from the techniques detailed herein is optical character recognition (OCR) Like image fingerprinting, OCR is an exercise in trying to match features in captured imagery with reference features. If the image features are distorted by an oblique viewpoint, character recognition becomes more difficult (e.g., the letters Q, G, and O are more likely to be mistaken for each other; ditto K and H, etc.). Thus, the present technology can be used to obtain a less-distorted frame of imagery, to which known OCR techniques can be applied—enhancing their accuracy.

Aspects of the technology can be used in still other applications. For example, an object may include a watermark, whose reading is optimized by the present technology. However, the user's actions may not be motivated by trying to read the watermark, per se. Instead, entertainment software may be provided that leads the user to move the phone in the above-detailed manners, in connection with play of a game or the like. Reading of the watermark may be an incidental by-product of such action. The watermark can reveal whether the user is playing the game in the context of, e.g., Sports Illustrated Magazine, or Better Housekeeping magazine, etc., and the game can issue rewards that vary with the magazine.

Another application is to use the discerned perspective information in a computational photography method to create a narrow depth of field in an image. Portraits are often enhanced by a narrow depth of field where objects behind the intended subject are blurred. Once perspective is known and/or the relative distance of objects in a pair of images are known, the image can be reconstructed where objects at the desired distance are rendered sharply, and objects at other distances are blurred. Alternatively or additionally, objects can be removed from imagery based on their distance or position.

Still another application is to provide 3D reconstructions. Consider a user who takes a picture of a person using the two-image scan arrangement noted earlier. The result can be a 3D model of the person that can be manipulated on the cellphone screen to see the person's face from any position and lighting.

Yet another application concerns physical 3D game environments. Consider two children sitting across a restaurant table from each other, watching on their smartphone screens as their 3D avatars run around the table top, hiding behind ketchup bottles, sugar jars, etc. Another is to augment reality to play a game of virtual chess on the table. The players may also interact with the virtual environment using their hands in the scene. All such arrangements are enabled by the perspective/distance determination methods detailed above.

Concluding Remarks

While described in the context of determining the perspective geometry from a camera to a planar object (i.e., a newspaper page), the same principles can be applied to determine the geometry by which objects of other shapes—such as 3D cylinders and other non-planar objects—are viewed.

It will be recognized that, unlike usual watermark decoding operations—which determine watermark scale from calibration features embedded within the watermark, certain of the detailed embodiments use non-watermark feature alignment methods to calibrate the document content position, and document scale. This allows the document content itself to serve as the scaled reference. The calibrated document information can then be used to obtain imagery optimized for watermark detection. With such optimized imagery, speed of watermark detection is minimized, and the watermark detector is also more forgiving of factors such as sub-optimal light level and image sharpness.

Another benefit of the document-as-reference approach is that multiple watermark series can be differentiated by their absolute scales. For example, a newspaper may be watermarked at a resolution of 50 watermark elements per inch (WPI), and a magazine may be watermarked at a resolution of 75 WPI. Both can be detected by the same watermark detector, reading from the same distance. But since the absolute scale of the document is known, the watermark detector can also discern whether the watermark it is reading is of the 50 or 75 WPI variety—thus immediately indicating whether the document is a newspaper or magazine.

While certain of the detailed arrangements employed two image frames, e.g., captured at locations A and B in FIG. 6, other embodiments can employ multiple image frames. (The identification and alignment of corresponding image features can be simpler when images from closely spaced vantage points are used.) The selection, and number, of image frames may be determined on a case-by-case basis, by assessing frames for sharpness, exposure, etc., as they are output by the camera system, and then undertaking the analysis as soon as a suitable set of frames is available (perhaps before the user has finished the sweep motion).

Likewise, while certain of the foregoing descriptions spoke of counteracting perspective distortion of the image acquired at position A or B, and providing same to the watermark detector, it will be understood that imagery acquired anywhere within a characterized geometrical framework can be corrected and used as the basis for watermark decoding (or other processing).

Similarly, in some embodiments, imagery from several frames may be combined, and the resultant image frame then provided to the watermark detector. (If the frames are taken from different viewpoints, they may be respectively perspective-corrected prior to combination.)

Although certain detailed arrangements characterized the position of the smartphone relative to the object in terms of two angles, and one radial distance, the position can alternatively (and equivalently) be characterized in terms of X-, Y- and Z-offset distances from the Cartesian origin (or other reference point).

This disclosure is supplemented by three appendices in the priority application 61/446,464 that more particularly detail the relationships governing appearances of objects from different perspectives.

Appendix A of the priority application provides a detailed derivation of how to estimate projective transform from two views of an object.

Appendix B of the priority application is an excerpt from the PhD thesis of Snavely, "Scene Reconstruction and Visualization from Internet Photo Collections," University of Washington, 2008. These excerpts teach how corresponding image features in different photographs can be identified, and how the geometries of the two photographs can thereby be spatially related. Relatedly, Snavely teaches "structure through motion" methods. (Snavely's work is also detailed in published patent application 20070110338.)

Appendix C of the priority application is a review of perspective, based on the Wikipedia article "3D Projection."

The Wikipedia article "Structure from Motion" provides additional information on such technology, and includes links to several such software packages. These include the Structure from Motion toolbox by Vincent Rabaud, Matlab Functions for Multiple View Geometry by Andrew Zissermann, the Structure and Motion Toolkit by Phil Torr, and the Voodoo Camera Tracker (a tool for integrating real and virtual scenes, developed at the University of Hannover).

Mathematical models that can be implemented to determine perspective and distance as detailed herein are further discussed in the book: Hartley, Multiple View Geometry in Computer Vision, Cambridge University Press, 2004.

From the present disclosure—including the noted sources, an iPhone software developer (or a developer for other handheld platforms) should be able to implement embodiments of the present technology without undue experimentation.

The design of smart phones is familiar to the artisan. In general terms, each includes one or more processors (e.g., of an Intel, AMD or ARM variety), one or more memories (e.g. RAM), storage (e.g., a disk or flash memory), a user interface (which may include, e.g., a keypad, a TFT LCD or OLED display screen, touch or other gesture sensors, a camera or other optical sensor, a compass sensor, a 3D magnetometer, a 3-axis accelerometer, 3-axis gyroscopes, a microphone, etc., together with software instructions for providing a graphical user interface), interconnections between these elements (e.g., buses), and an interface for communicating with other devices (which may be wireless, such as GSM, CDMA, W-CDMA, CDMA2000, TDMA, EV-DO, HSDPA, WiFi, WiMax, mesh networks, Zigbee and other 802.15 arrangements, or Bluetooth, and/or wired, such as through an Ethernet local area network, a T-1 internet connection, etc).

The reader is presumed to be familiar with the touch screen interfaces that are common in smartphones. The iTouch interface introduced by Apple in its iPhone and iPod products is disclosed in its patent publications 20080174570 and 20080122796.

To review, a few of the many novel arrangements detailed in this specification include:

A method employing a camera-equipped mobile telecommunications device in conjunction with an object (e.g., a newspaper or other printed substrate), which includes capturing first and second imagery from the object when the device is at first and second different positions. By reference to such imagery, pose data is determined that characterizes at least part of a geometrical pose between the device and the object (e.g., defining a plane in which the object lies, and the position of the device relative to that plane). Then, through use of this determined pose data, final object image data with reduced perspective distortion (relative to at least the first or second captured imagery) is obtained.

In some arrangements, this final object image data is obtained by geometrically-compensating (e.g., warping) earlier-acquired imagery. In other arrangements, new final object image data is obtained by guiding the user—with one or more prompts—so as to position the camera phone at a more optimal viewpoint, from which the final object image may be captured.

A sensor in the device can be employed to gather data at the first and second positions, by which a distance between such positions can be estimated. From this estimated distance, scale information about the object depicted in the final object image data can be determined. (This sensor can be a sensor distinct from the camera's optical sensor, e.g., an accelerometer or gyroscopic sensor, or a radio signal-based location determination system.)

From the final object image data, identification data related to the object can be derived, e.g., a digital watermark can be decoded, an image fingerprint can be calculated, or text data can be determined by OCR-processing.

Another method employs a camera-equipped mobile telecommunications device in conjunction with an object, and includes sensing first data relating to a position of the device when the device is touching the object, with a face of the device being parallel with a face of said object. Then, after the device is moved to a second location—removed from the object—the position of the device is sensed a second time, and first object imagery is captured from this second location. By reference to the first and second position data, the pose of the device relative to the object at the second location is determined.

This determined pose information can be used to obtain object image data with reduced perspective distortion (relative to the first object imagery), by arrangements such as those just-noted above.

Yet another method employs a camera-equipped mobile telecommunications device in conjunction with first and second objects. The method includes capturing image data from a camera field of view that includes both of the objects and, by reference to image data related to the second object (e.g., a coin, banknote, wallet card, key or finger), determining a scale of the first object (e.g., a portion of a newspaper page). Knowing this scale, the image data is then processed to derive identification data corresponding to the first object (e.g., fingerprint data, or decoded machine readable data).

In a related method, a physical reference item is used to gauge a scale of imagery captured by such a device. In a particular such method, such a reference item is placed on a display screen of the device, enabling the user to reposition the device to achieve a desired relationship between the physical reference item, and a feature of displayed imagery.

Still another aspect is a spirit level-type UI that is centered at orientations other than horizontal. Yet another is a spirit level-type UI in which the center element does not move unless a tilt greater than a pre-set threshold is exceeded.

Of course, apparatuses that practice the foregoing methods, and software stored on tangible media that program processors to practice the foregoing methods, are also part of our inventive work.

To provide a comprehensive disclosure without unduly lengthening this specification, applicants incorporate by reference each of the patents, applications, and other documents referenced herein. (Such documents are incorporated in their entireties, even if cited above in connection with specific of their teachings.) These references disclose technologies and teachings that can be incorporated into the arrangements detailed herein, and into which the technologies and teachings detailed herein can be incorporated.

We claim:

1. A method of using a camera-equipped mobile telecommunications device, comprising:
    capturing first imagery of an object, when the device is at a first position relative to the object;
    capturing second imagery of the object, when the device is at a second, different, position relative to the object;
    by reference to the first and second imagery, determining pose data that characterizes at least part of a geometrical pose between the device and the object;
    through use of said determined pose data, obtaining image data corresponding to the object with reduced perspective distortion, relative to at least one of the first or second captured imagery; and
    processing said obtained image data to derive identification data therefrom.

2. The method of claim 1 that further includes:
    using a device sensor distinct from the device camera, acquiring first sensor data when the device is in the first position;
    using said device sensor, acquiring second sensor data when the device is in the second position;
    by reference to the first and second acquired sensor data, estimating a distance between the first and second positions; and
    by reference to said estimated distance, estimating scale information about the object depicted in the obtained image data.

3. The method of claim 2 in which said device sensor comprises an accelerometer, magnetometer or gyroscopic sensor.

4. The method of claim 2 in which said device sensor comprises a radio signal-based location determination system.

5. The method of claim 1 in which the object comprises a substrate printed with encoded machine-readable data, and the processing comprises decoding said machine-readable data.

6. The method of claim 5 in which the identification data comprises decoded digital watermark data.

7. The method of claim 1 in which the object comprises a substrate printed with text, and the processing comprises recognizing the text, and outputting information corresponding thereto.

8. The method of claim 1 in which the identification data comprises fingerprint data.

9. The method of claim 8 in which the fingerprint data comprises SIFT or SURF data.

10. The method of claim 1 in which the obtaining act includes providing one or more prompts to a user to guide the user in positioning the device, so as to capture imagery with said reduced perspective distortion.

11. The method of claim 10 in which the providing act includes augmenting an image of the object, displayed on the screen of the device, with a superimposed graphic feature, a position of said superimposed graphic feature being dependent on said determined pose data.

12. The method of claim 1 in which the obtaining act includes warping captured imagery so as to yield imagery with said reduced perspective distortion.

13. The method of claim 1 in which the determining act includes determining a plane in which a surface of the object lies, relative to the device.

14. The method of claim 1 in which the object comprises a printed substrate.

15. A method of using a camera-equipped mobile telecommunications device, comprising:
    using a device sensor distinct from the device camera, acquiring first sensor data when the device is in a first position relative to an object;
    using said device sensor, acquiring second sensor data when the device is in a second position relative to the object;
    by reference to the first and second acquired sensor data, estimating a distance between the first and second positions; and
    by reference to said estimated distance, and to imagery captured by the camera, estimating (1) a distance to the object; or (2) scale information about the object as depicted in the imagery.

16. A method of using a camera-equipped mobile telecommunications device, comprising:
    sensing first data relating to position of the device when the device is at a first location, in said first location the device touching an object;
    sensing second data relating to position of the device when the device is at a second location, removed from the object;
    capturing first imagery from the object using the device camera; and
    by reference to the first and second data, determining pose data about a geometrical pose of the device relative to the object associated with the captured imagery.

17. The method of claim 16 in which, in said first location, a face of the device is parallel with a face of said object.

18. The method of claim 16 that further includes, through use of said determined pose data, obtaining image data corresponding to the object with reduced perspective distortion, relative to said captured first imagery.

19. The method of claim 18 in which the obtaining act includes providing one or more prompts to a user to guide the user in positioning the device, so as to capture imagery with said reduced perspective distortion.

20. The method of claim 19 in which the providing act includes augmenting an image of the object, displayed on the screen of the device, with a superimposed graphic feature, a position of said superimposed graphic feature being dependent on said determined pose data.

21. The method of claim 18 in which the obtaining act includes warping the captured first imagery so as to yield imagery with said reduced perspective distortion.

22. A method of using a mobile telecommunications device, comprising:

sensing a first orientation of the device when the device is at a first position, in said first position the device touching an object;

presenting a user interface including an indication related to the orientation of the device in said first position; and updating said user interface to present an indication related to an updated orientation of the device, as the device is repositioned to a second position;

wherein the user interface is adapted to help a user reposition the device to a second position in which the orientation of the device is parallel to the first orientation.

23. The method of claim 22 in which:

the device includes a camera portion;

the object includes steganographically encoded data sensible from said object; and the method includes capturing imagery of said object, and decoding the steganographically encoded data from said captured imagery.

24. The method of claim 22 in which, in the first position, a face of the device is parallel with a face of said object.

25. A method of using a camera-equipped mobile telecommunications device, comprising:

capturing image data depicting first and second objects;

by reference to image data related to the second object, determining scale information related to the first object; and presenting a user interface that aids a user in movement of the device to a different viewing position, based on the determined scale information.

26. The method of claim 25 that includes processing image data from the device to derive identification data corresponding to the first object.

27. The method of claim 26 wherein the identification data comprises fingerprint data, decoded machine readable data, or recognized text data.

28. A method of using a camera-equipped mobile telecommunications device, comprising:

capturing image data depicting first and second objects;

by reference to image data related to the second object, determining scale information related to the first object; and using the determined scale information in a procedure that processes captured image data to derive fingerprint data or decoded machine readable data corresponding to the first object.

29. A method comprising:

capturing imagery using a camera-equipped mobile telecommunications device; and presenting with the captured imagery, on a screen of the device, a guide indicia adapted to establish a desired relationship between a feature of the presented imagery, and a physical item placed on said screen.

30. The method of claim 29 in which the desired relationship is a desired scale factor of the imagery.

31. The method of claim 25, wherein the captured image data simultaneously depicts the first and second objects.

32. The method of claim 28, wherein the captured image data simultaneously depicts the first and second objects.

* * * * *